United States Patent
Runyan

(10) Patent No.: US 9,459,019 B2
(45) Date of Patent: Oct. 4, 2016

(54) METHOD AND APPARATUS FOR METAL POSITIONING AND FORMING

(71) Applicant: MESTEK MACHINERY, INC., Westfield, MA (US)

(72) Inventor: Randy Runyan, Oxford, IA (US)

(73) Assignee: MESTEK, INC, Westfield, MA (US)

( * ) Notice: Subject to any disclaimer, the term of this patent is extended or adjusted under 35 U.S.C. 154(b) by 153 days.

(21) Appl. No.: 14/163,038

(22) Filed: Jan. 24, 2014

(65) Prior Publication Data

US 2014/0202225 A1     Jul. 24, 2014

Related U.S. Application Data

(60) Provisional application No. 61/756,226, filed on Jan. 24, 2013, provisional application No. 61/766,207, filed on Feb. 19, 2013.

(51) Int. Cl.
| | |
|---|---|
| *F24F 13/02* | (2006.01) |
| *B21D 35/00* | (2006.01) |
| *F16L 9/00* | (2006.01) |
| *B21D 5/04* | (2006.01) |
| *B65B 51/04* | (2006.01) |

(52) U.S. Cl.
CPC ........... *F24F 13/0245* (2013.01); *B21D 35/00* (2013.01); *F16L 9/003* (2013.01); *B21D 5/04* (2013.01); *B65B 51/04* (2013.01)

(58) Field of Classification Search
CPC ........ B21D 39/02; B21D 35/00; B21D 5/04; B21C 37/104; B31B 17/00; B31B 1/02; B31B 2217/00; Y10T 29/49936; Y10T 83/4743; F16L 9/003; F16L 9/17; F24F 13/0245

See application file for complete search history.

(56) References Cited

U.S. PATENT DOCUMENTS

| | | | |
|---|---|---|---|
| 3,986,470 A | 10/1976 | Berry et al. | |
| 7,650,729 B2 * | 1/2010 | Whittlesey | A22C 11/02 198/813 |
| 8,171,766 B1 * | 5/2012 | Slavik | B21D 35/00 72/177 |
| 8,499,604 B2 * | 8/2013 | Borwig | B21D 5/04 29/521 |
| 2006/0068981 A1 | 3/2006 | Coullery et al. | |
| 2008/0060916 A1 | 3/2008 | Whittlesey | |
| 2010/0077821 A1 | 4/2010 | Borwig et al. | |
| 2012/0260713 A1 | 10/2012 | Borwig et al. | |

* cited by examiner

*Primary Examiner* — Peter DungBa Vo
*Assistant Examiner* — John S Lowe
(74) *Attorney, Agent, or Firm* — Grogan, Tuccillo & Vanderleeden, LLP

(57) ABSTRACT

A duct making apparatus includes a first station configured to accept a formable sheet material and a second station configured to receive the formable sheet material from the first station. The first station includes a mechanism for forming one of a male lock bend and a female lock seam in a leading edge of the formable sheet material. The second station includes a retractable conveyor. Movement of the sheet material from the first station to the second station defines an axis of travel of the sheet material. The retractable conveyor is selectively movable from a first position in which the retractable conveyor is in close association with the first station, and a second position in which the retractable conveyor is spaced from the first station.

11 Claims, 16 Drawing Sheets

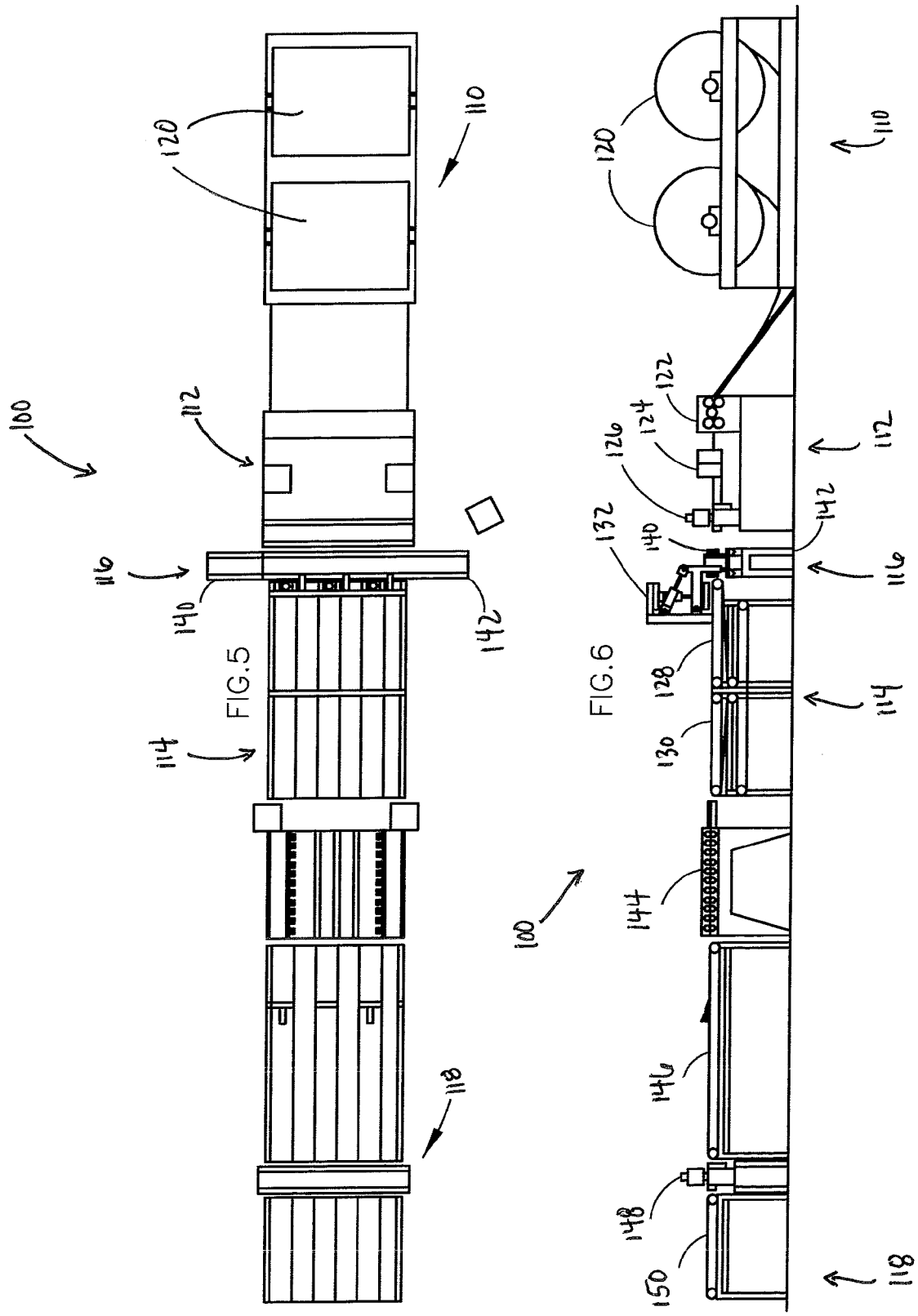

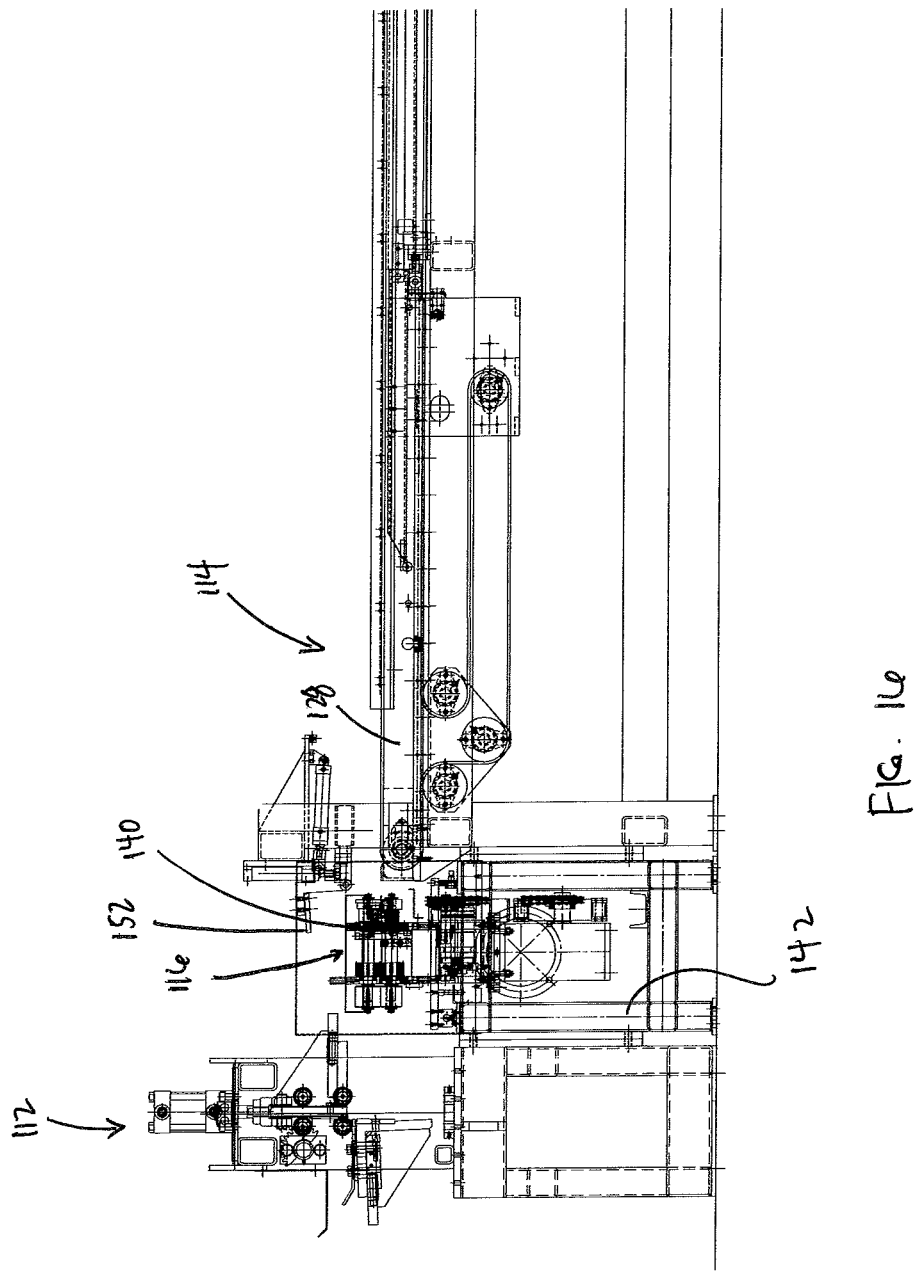

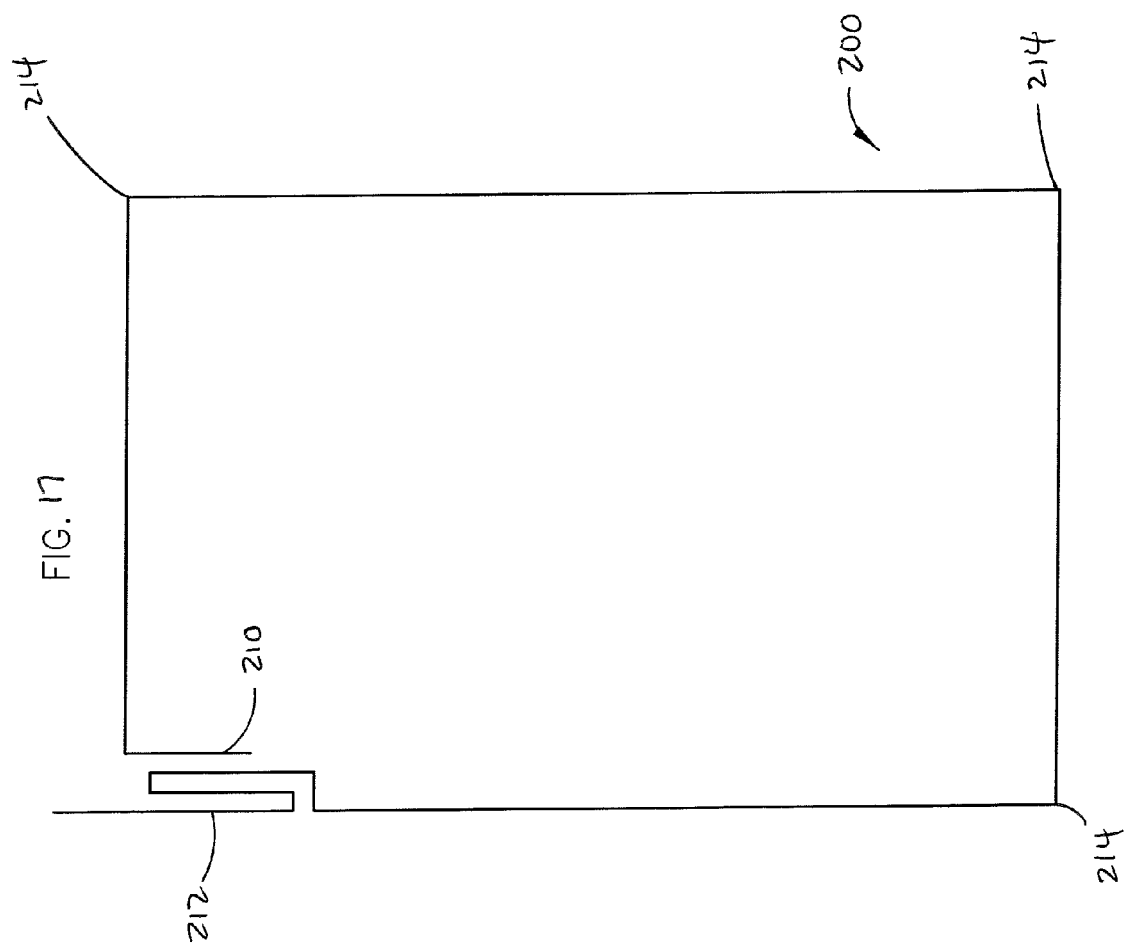

METHOD AND APPARATUS FOR METAL POSITIONING AND FORMING

CROSS-REFERENCE TO RELATED APPLICATIONS

This application claims the benefit of U.S. Provisional Application Ser. No. 61/756,226, filed on Jan. 24, 2013, and U.S. Provisional Application Ser. No. 61/766,207, filed on Feb. 19, 2013, which are herein incorporated by reference in their entireties.

FIELD OF THE INVENTION

The present invention relates generally to metal working apparatuses and methods, and more particularly, to an apparatus and method for bending sheet metal to form ventilation ducts.

BACKGROUND OF THE INVENTION

Box-shaped ducts are extensively used in heating and ventilating systems to distribute heated or cooled air throughout a structure. The ducts are commonly formed in sections of predetermined length, which are then connected to form a continuous air distribution duct. The material from which the duct sections are formed is sheet metal of the desired gauge fed from a roll or coil of material. As the sheet metal uncoils, it is flattened or straightened to remove the curved set in the material that exists from it being coiled. The sheet metal is then notched along its side edges at predetermined distances where the corners of the duct section will be formed. A shear then cuts the material into blanks of a length necessary to form a finished duct section. This notched blank is then moved 90 degrees onto a roll former to form the male and female portions of a lock seam at the opposite ends of the blank. The blank is then transferred once again, usually 90 degrees, into a roll former to form the flanges that will provide for connection of the individual duct sections. When the flanges have been formed, the blank is then transferred to a sheet metal break where three 90 degree bends are made to form the box-shaped duct section.

As will be readily appreciated, transferring the material both longitudinally and sideways from station to station to form the lock seams and flanges requires a considerable amount of floor space for the equipment, conveyors and transfer tables between the stations. Often times, therefore, large spaces are needed to accommodate the width of existing duct fabricating machines, which increases overhead operating costs.

There is therefore a need for an improved method and apparatus for forming duct sections which minimizes the amount of floor space required to carry out the complete forming process, and which provides for the forming of duct sections more quickly and efficiently and at a lower cost as compared to existing apparatuses.

SUMMARY OF THE INVENTION

It is an object of the present invention to provide an automatic duct making apparatus for metal positioning and forming.

It is an object of the present invention to provide a duct making apparatus for bending sheet metal to form ventilation ducts.

It is another object of the present invention to provide a duct making apparatus that is smaller and fits into existing shop areas that are too small for existing duct forming machinery.

It is another object of the present invention to provide a duct making apparatus that is capable of providing various styles of ducting, including welded flange and raw edge connections using slide on flange technology.

It is another object of the present invention to provide a duct making apparatus that is narrow in width as compared to existing systems.

It is another object of the present invention to provide a duct making apparatus that competes with existing wide-footprint systems.

It is another object of the present invention to provide a duct making apparatus that is configured to move a duct blank workpiece straight forward during forming operations without moving the duct blank sideways or reversing the duct blank in the opposite direction for completing the operations for finishing the duct section.

It is another object of the present invention to provide a duct making apparatus that substantially eliminates the use of servomotors for positioning of the duct blank during forming operations.

According to an embodiment of the present invention, a duct making apparatus includes a first station configured to accept a formable sheet material and a second station configured to receive the formable sheet material from the first station. The first station includes a mechanism for forming one of a male lock bend and a female lock seam in a leading edge of the formable sheet material. The second station includes a retractable conveyor. Movement of the sheet material from the first station to the second station defines an axis of travel of the sheet material. The retractable conveyor is selectively movable from a first position in which the retractable conveyor is in close association with the first station, and a second position in which the retractable conveyor is spaced from the first station.

According to another embodiment of the present invention, a duct making apparatus is provided. The duct making apparatus includes a first station configured to accept a formable sheet material, a second station configured to receive the formable sheet material from the first station, and a third station including a roll forming assembly. The second station includes a conveyor for moving the sheet material along an axis of travel. The roll forming assembly is selectively movable into and out of a space between the first station and the second station in a direction orthogonal to the axis of travel.

According to yet another embodiment of the present invention, a method of forming a duct section from a web of material is provided. The method includes the steps of, at a first station, forming one of a male lock bend and a female lock seam in a leading edge of the web of material, at a second station, receiving the web of material from the first station, and at a third station, forming the other of a male lock bend and a female lock seam in a trailing edge of the web of material.

BRIEF DESCRIPTION OF THE DRAWINGS

The present invention will be better understood from reading the following description of non-limiting embodiments, with reference to the attached drawings, wherein below:

FIG. 5 is a top plan view of an apparatus for metal positioning and forming according to an embodiment of the present invention.

FIG. 6 is a side elevational view of the apparatus of FIG. 5.

FIG. 16 is a side elevational view of the metal positioning and forming apparatus of FIG. 5, showing a more detailed illustration thereof and showing the positioning of the roll forming assembly.

FIG. 17 is an end view of a duct section manufactured utilizing the apparatus of FIG. 5, with both lock seams and bends that complete a rectangular duct section.

DETAILED DESCRIPTION OF THE PREFERRED EMBODIMENT

Figure 1:
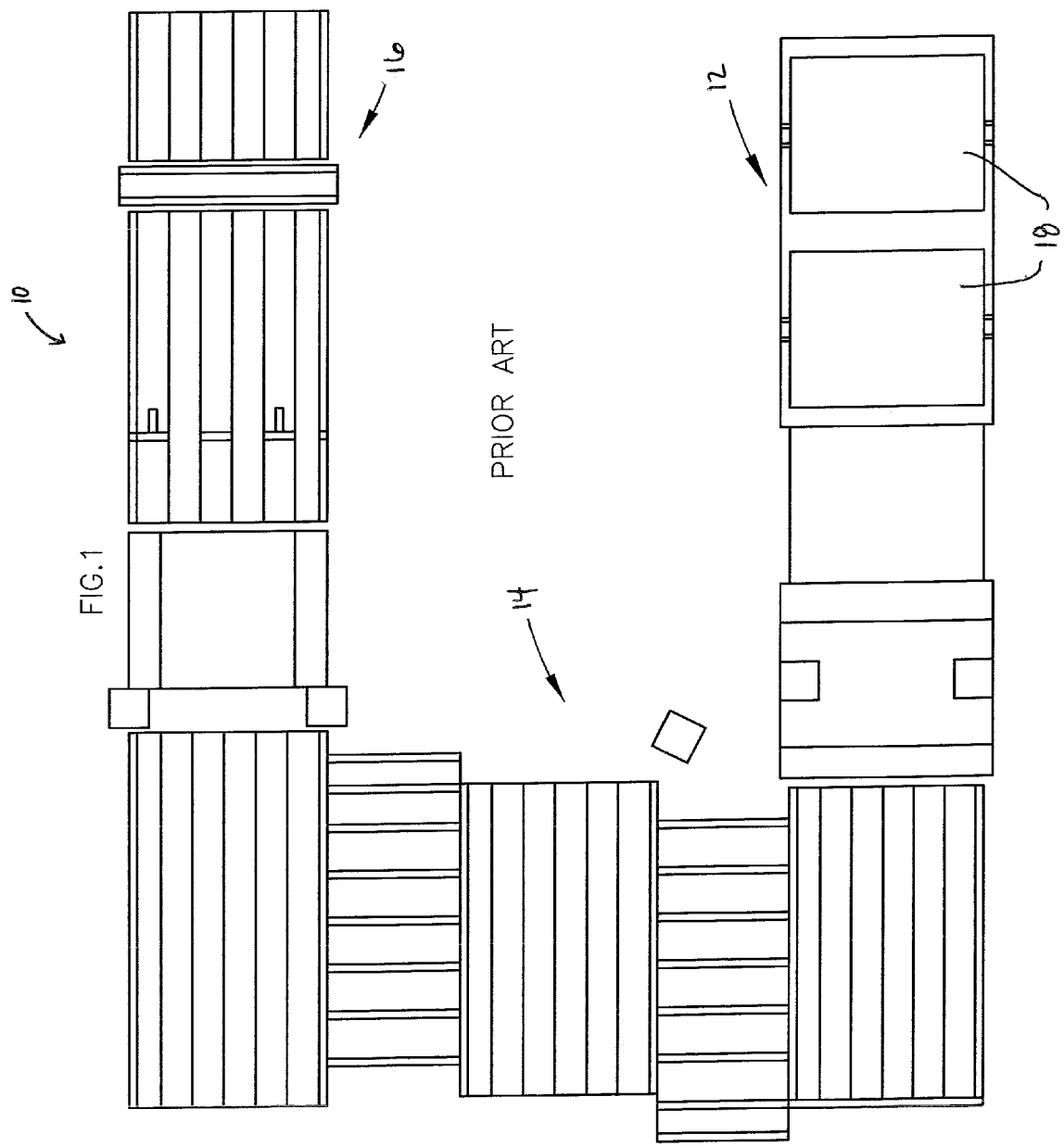
FIG. 1 is a schematic plan view of a prior art U-shaped duct making apparatus.
Figure 2:
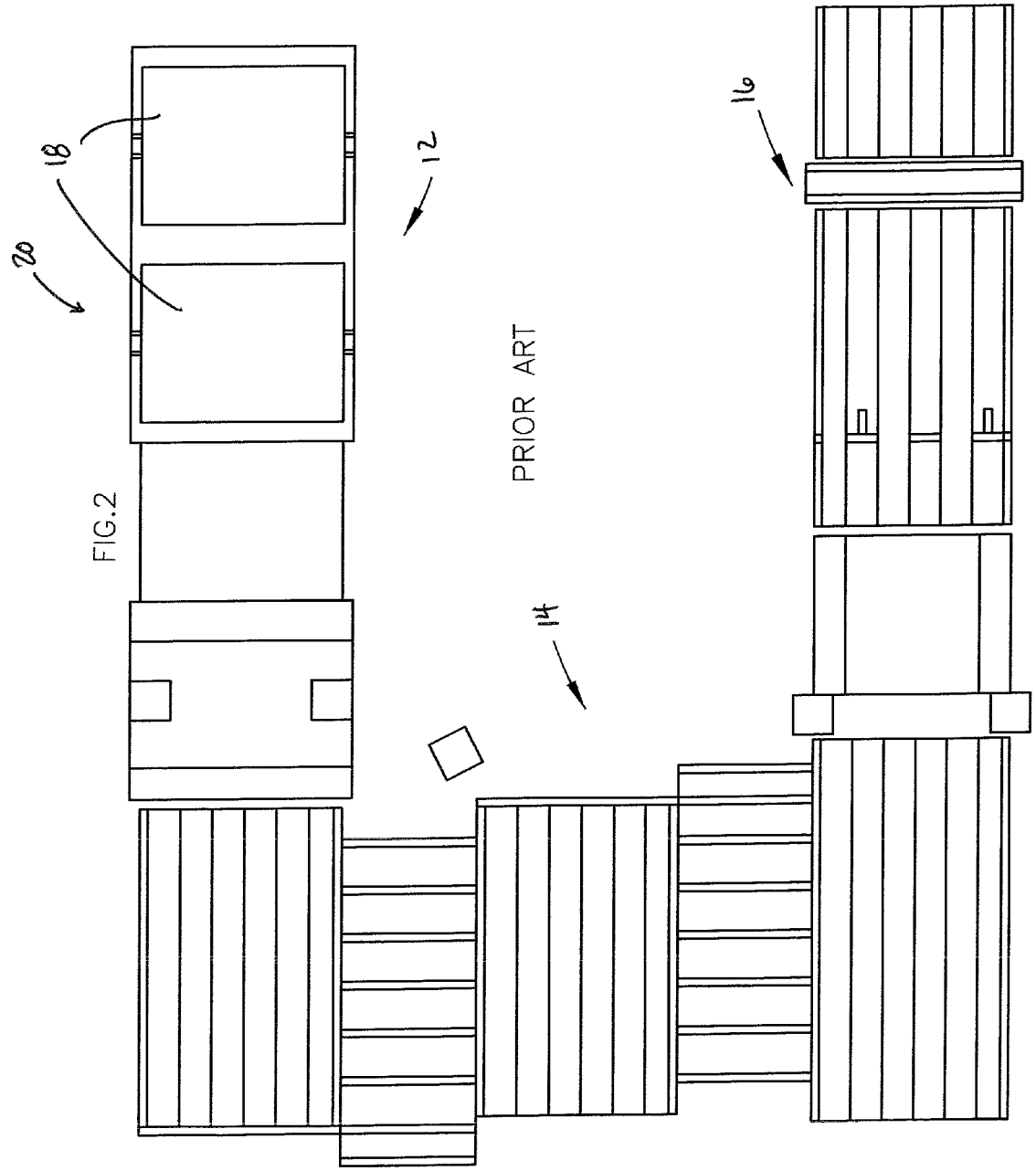
FIG. 2 is a schematic plan view of another prior art U-shaped duct making apparatus.
Figure 3:
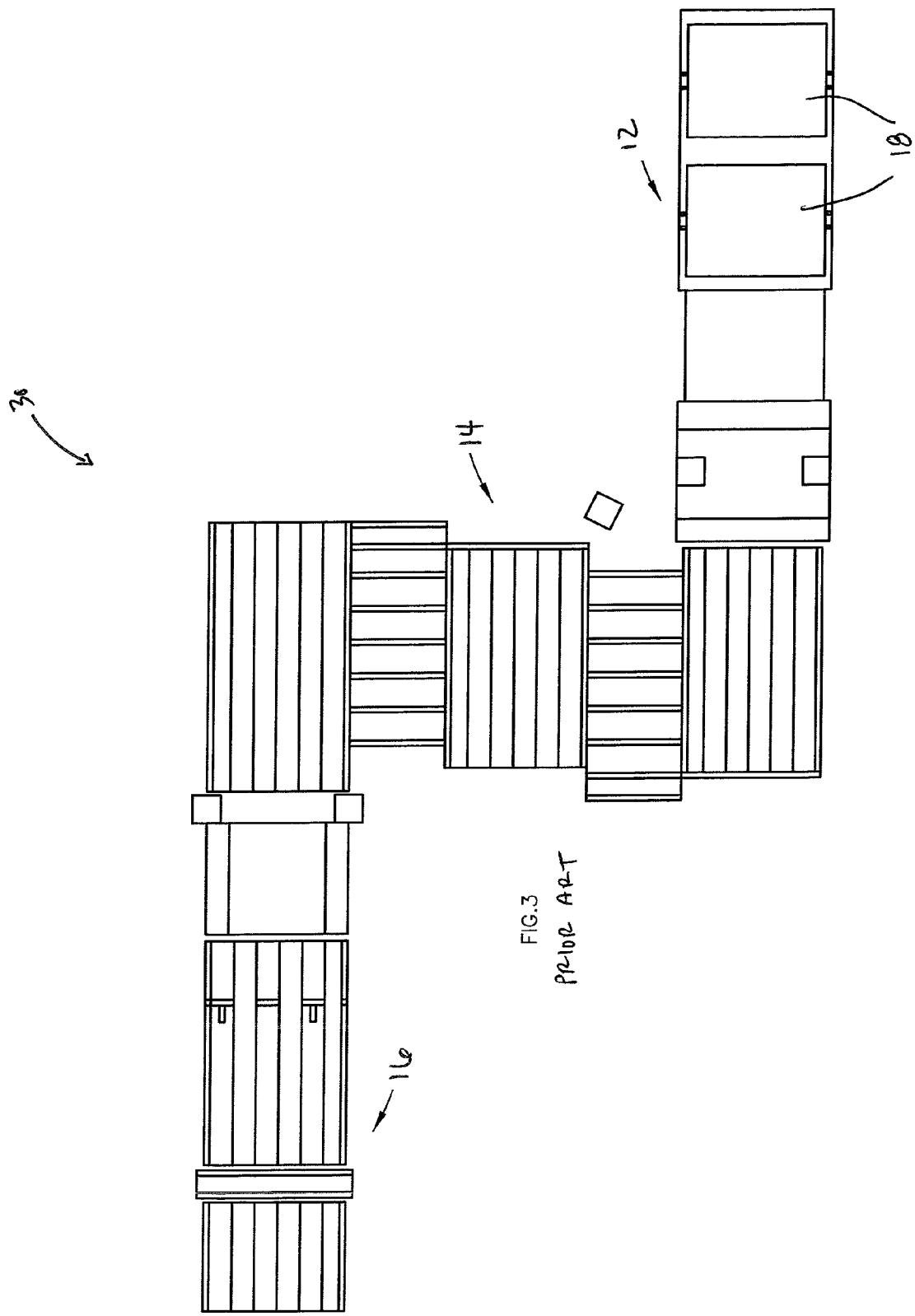
FIG. 3 is a schematic plan view of a prior art Z-shaped duct making apparatus.
Figure 4:
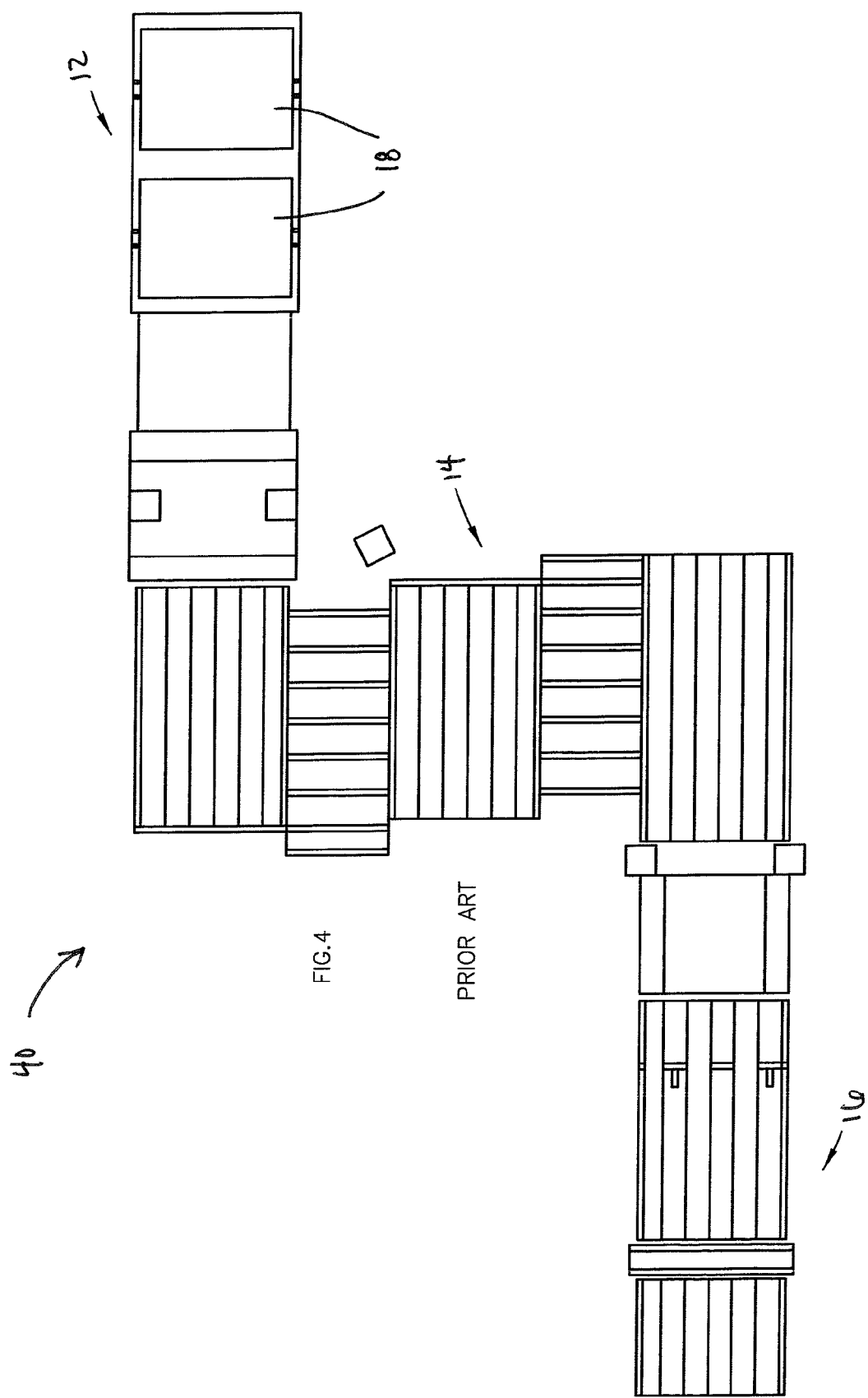
FIG. 4 is a schematic plan view of another prior art Z-shaped duct making apparatus.

FIGS. 1-4 are schematic views of known automatic duct making systems 10, 20, 30, 40 for making completed duct sections. Each of these systems 10, 20, 30, 40 include a start end 12, a lock seam roll forming section 14 and a finish end 16. As shown therein, with each of these systems 10, 20, 30, 40, sheet metal is unwound from large rolls or coils 18. As is well known to those skilled in the art, the width of the coil 18 determines the length of the completed duct section.

A duct blank is cut from the coil 18 and advanced in a first direction, e.g., from right to left as shown in FIGS. 1-4. The duct blank is then moved in a second direction substantially perpendicular to the first direction (e.g. from top to bottom or bottom to top as shown in FIGS. 1-4) and passes through the roll forming section 14. The roll forming section 14 has roll forming stations that are oriented perpendicular to the first direction of movement and form male and female lock seams, respectively, on opposed edges of the duct blank as the duct blank passes therethrough. The duct blank is then advanced in a third direction generally parallel to the first direction for subsequent bending and finishing operations prior to arriving at the finish end 16 as a substantially completed duct section.

As will be readily appreciated, the duct blank must be moved in a direction substantially perpendicular to the initial, first direction of movement in order to pass through the roll forming stations of the roll forming section 14 to form the male and female lock seams. As a result, prior art duct making apparatus typically take a U-shaped configuration, as illustrated by the duct making apparatuses 10, 20 shown in FIGS. 1 and 2, or a Z-shaped configuration, as illustrated by the duct making apparatuses shown in FIGS. 3 and 4. Both the U-shaped and Z-shaped apparatuses, however, require a considerable amount of floor space due to the need to move the duct blank perpendicularly through the roll forming section 14 and, therefore, are often substantially wider than will fit into many duct manufacturing shops. Indeed, the apparatuses 10, 20, 30, 40 shown in FIGS. 1-4 are approximately 25 feet wide, thereby requiring a large space to accommodate such apparatuses.

Turning now to FIGS. 5 and 6, an embodiment of a metal positioning and forming apparatus 100 of the present invention addresses the issue of limited floor space in many duct manufacturing shops, among others, by providing a substantially linear path of travel of the duct blank throughout the apparatus 100, even through the roll forming section that forms the male and female lock seams.

As shown therein, the metal positioning and forming apparatus 100 includes, at least, a start end 110, a first station 112, a second station 114, a third station 116, and a finish end 118 disposed about a common axis. At the start end 110 sheet metal of a desired gauge and width is supplied in large rolls or coils 120. As is well known to those skilled in the art, the sheet metal material from one of the coils 120 is fed by a feeder (not shown) into the first station 112. The first station includes a coil straightener 122, a notching section 124 and a bending shear 126, which each may take one of various forms known in the art.

The coil straightener 122 contains a plurality of rolls that will remove the set in the material caused by it being wound on a coil 120. The coil straightener 122 thus straightens the material and feeds the web of material to the notching section 124 that provides corner notches, if needed, for the style of duct section being processed. The notching section 124 is programmed to notch the side edges of the web of material at predetermined distances where the material will ultimately be bent to form the box-shaped duct section. In other words, the distance between the notches will correspond to the dimensions of the finished duct section.

The web of material then moves forward, from right to left in FIGS. 5 and 6, into the bending shear 126 of the first station 112. The bending shear 126 bends the leading edge of the web of material utilizing a built in bending die assembly to form a male lock seam, and then proceeds to shear the web of material to make a generally rectangular duct blank flat pattern. Movement of the web of material along the pathway defined by the apparatus 100, from starting end 110 to finish end 118 defines an axis of travel of the web.

Figure 7:
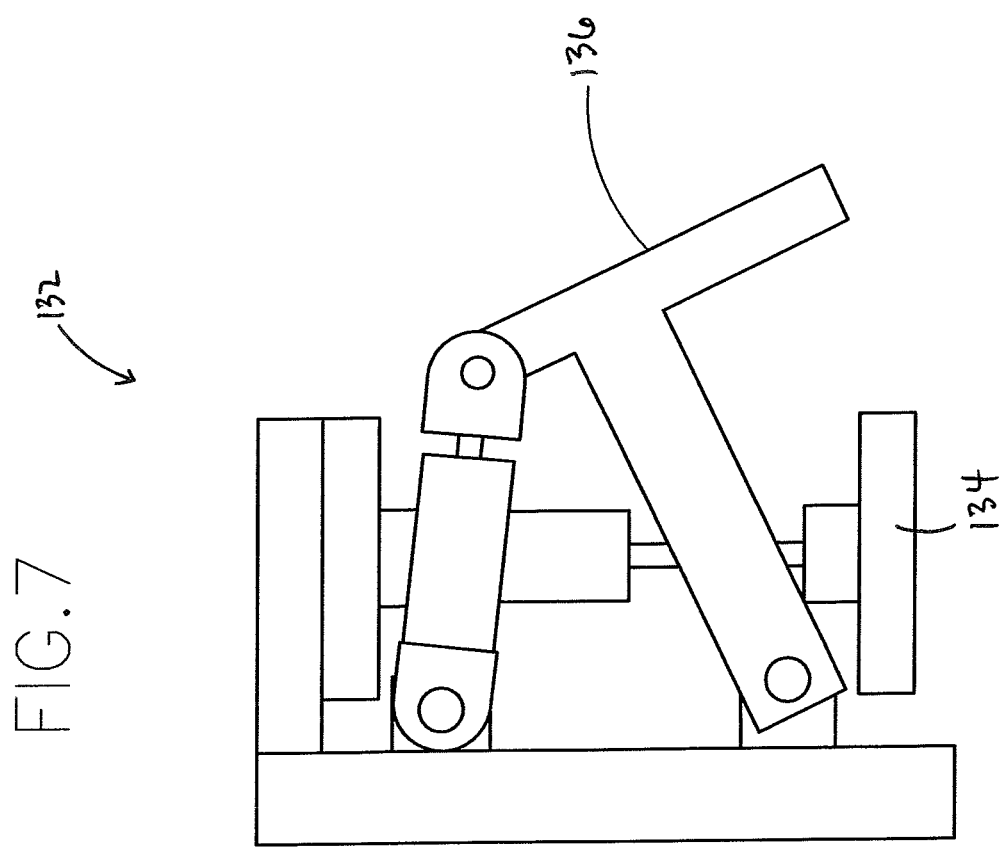
FIG. 7 is side elevational view of a positioning stop of the apparatus of FIG. 5, illustrated in its raised, pass through position.

With further reference to FIGS. 5 and 6, the second station 114 is positioned in line with the first station 112 along a linear direction of travel of the duct blank (i.e., the axis of travel) and includes a retractable conveyor 128, a feed conveyor 130 and a stop and clamp assembly 132. As best shown in FIG. 7, the stop and clamp assembly 132 includes a vertically movable clamp 134 and a pivotable stop 136. The clamp 134 and stop 136 may be hydraulic, pneumatic or electrically actuated, although any other means for actuating the clamp 134 and stop 136 along their constrained paths of travel known in the art may also be utilized without departing from the broader aspects of the present invention.

Figure 8:
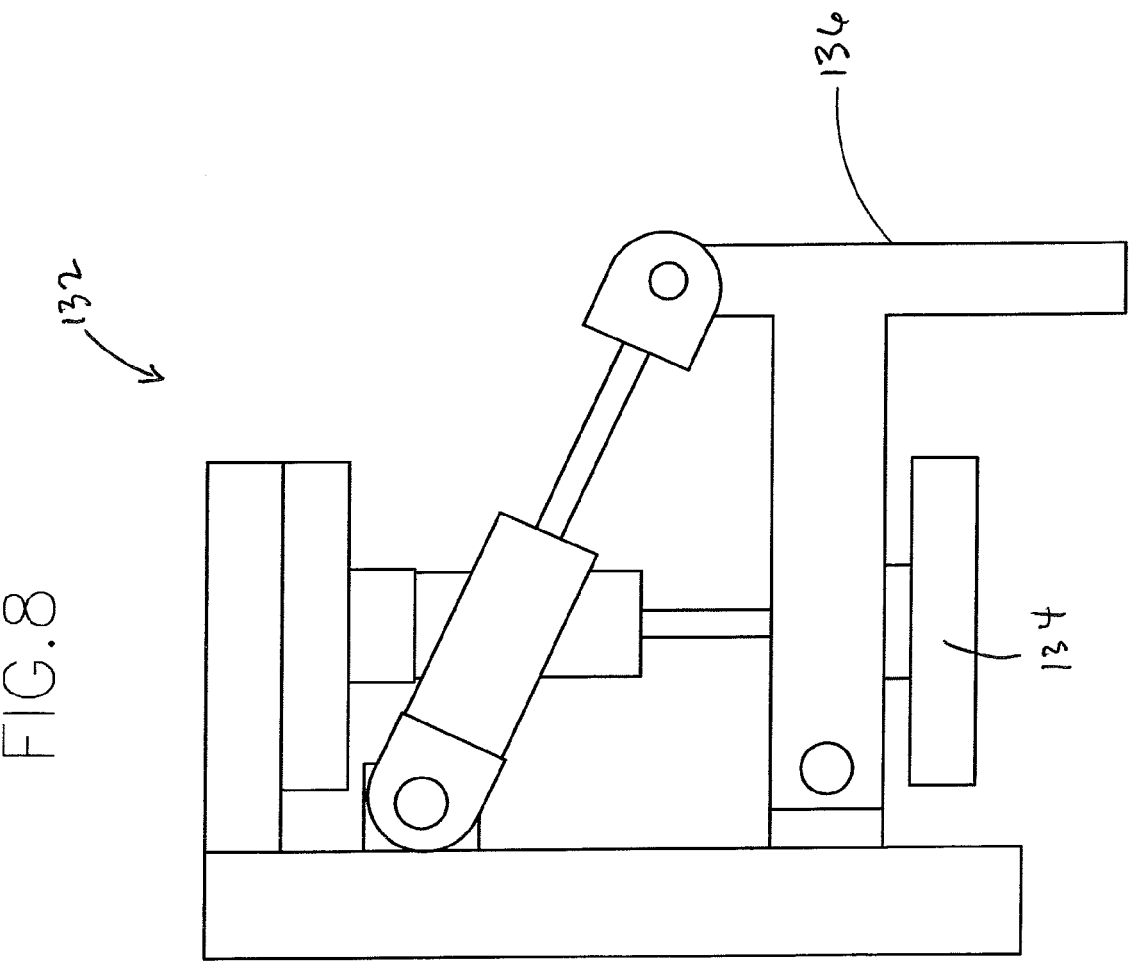
FIG. 8 is a side elevational view of the positioning stop of FIG. 7, illustrating the positioning stop in a lowered, engaging position with a sheet held in a slightly reversed position.
Figure 9:
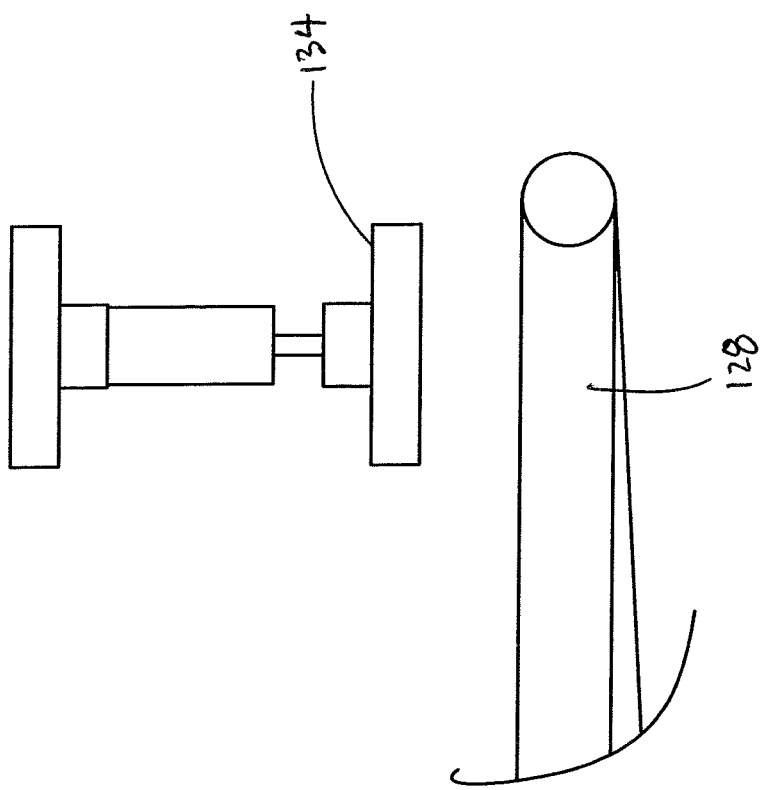
FIG. 9 is a side elevational view of a conveyor and holding clamp of the apparatus of FIG. 5, illustrating the holding clamp in a raised, pass-through position.

The stop 136 is selectively rotatable between a raised, pass-through position, as illustrated in FIG. 7, and a lowered, engaging position, as illustrated in FIG. 8, as discussed in detail below. Likewise, the clamp 134 is selectively movable between a, raised position in which the clamp 134 is spaced from a duct blank carried on the retractable conveyor 128, as shown in FIG. 9, and a lowered, clamping position in which the clamp 134 contacts the duct blank and holds it against the retractable conveyor 128, as also discussed in detail below.

Figure 12:
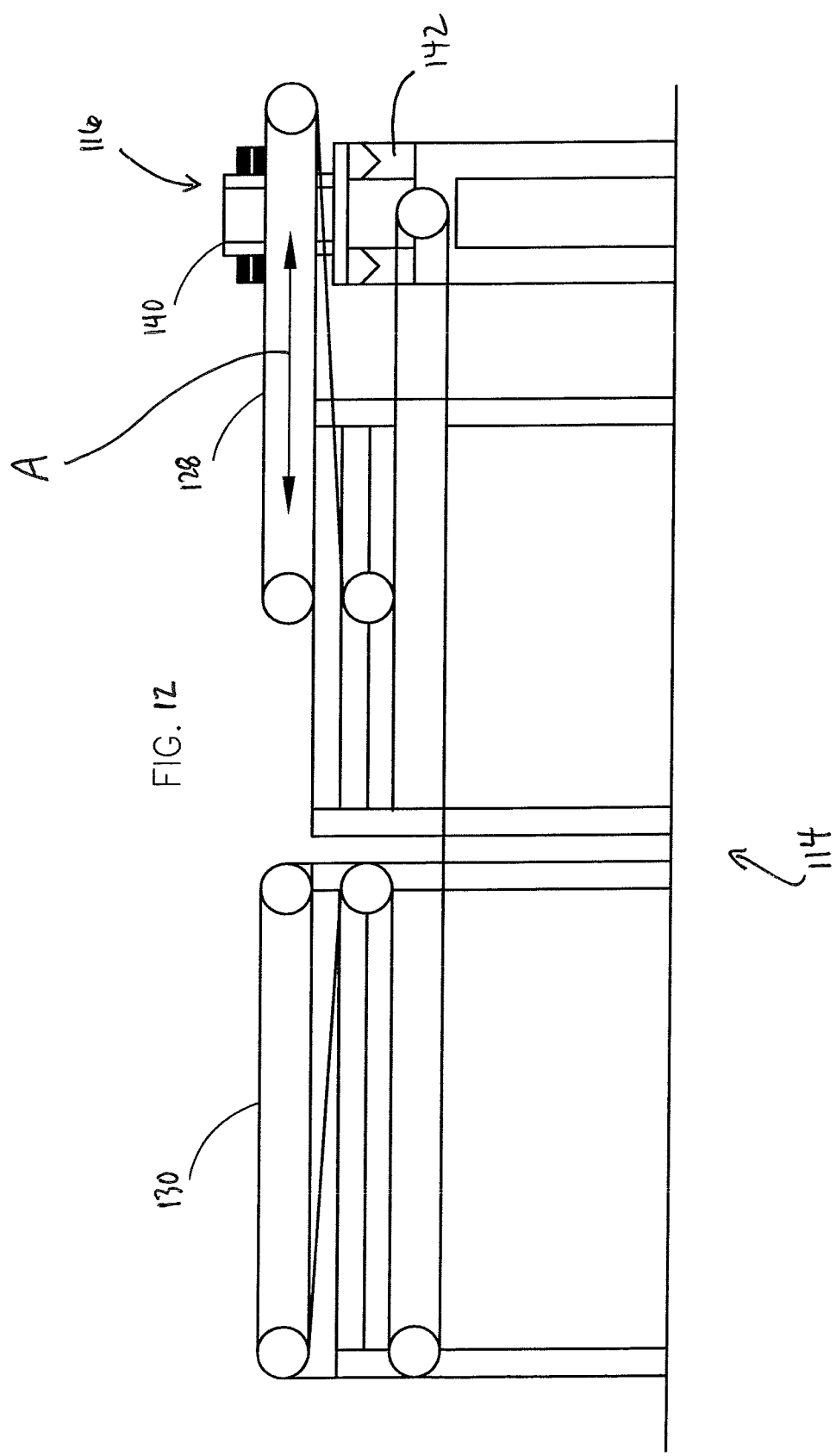
FIG. 12 is a side elevational, expanded view of the conveyor with the retractable conveyor portion in its extended position ready for receiving a sheet as it exits the shear.
Figure 13:
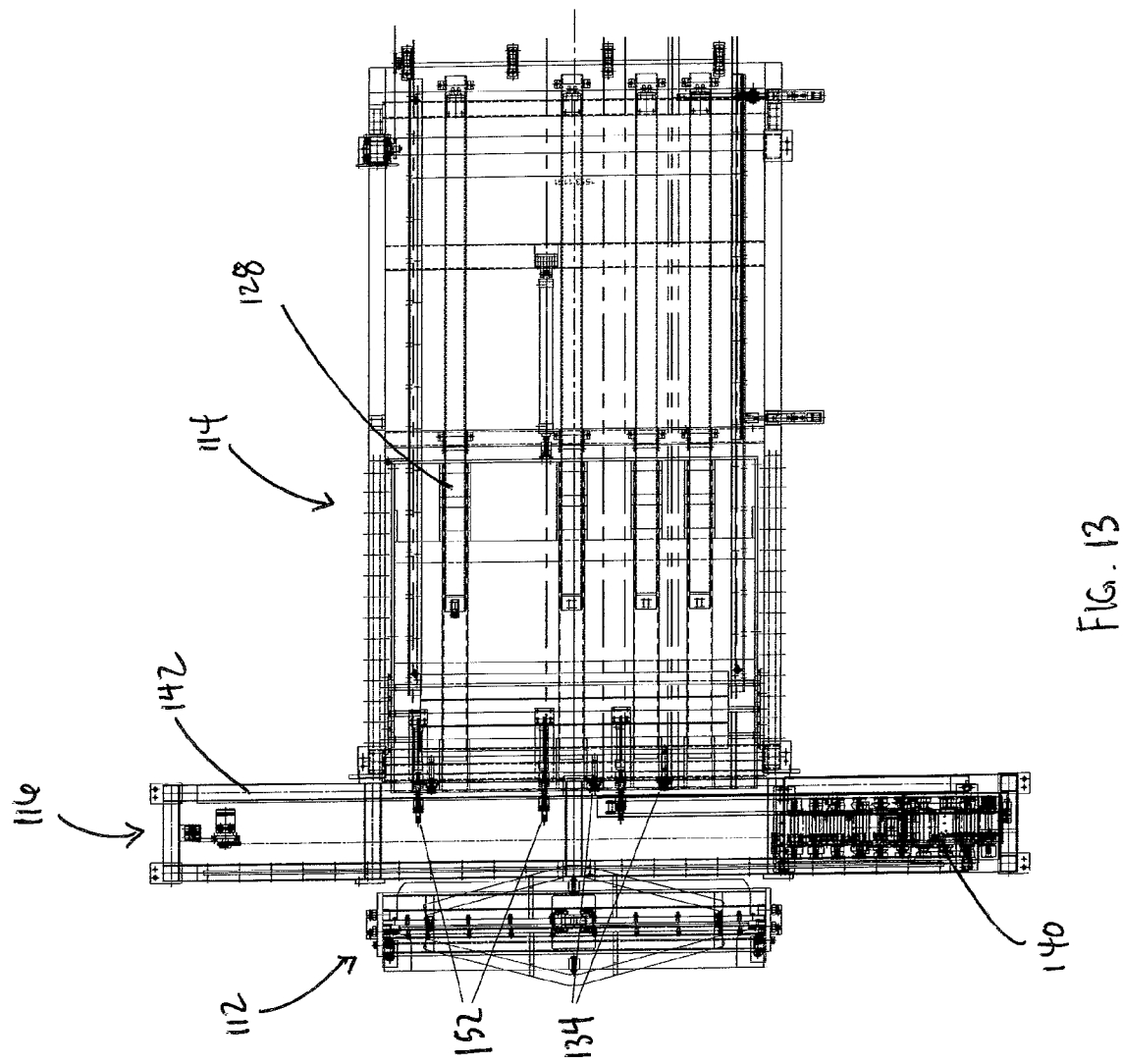
FIG. 13 is another top, plan view of the metal positioning and forming apparatus of FIG. 5, showing a more detailed illustration thereof.
Figure 14:
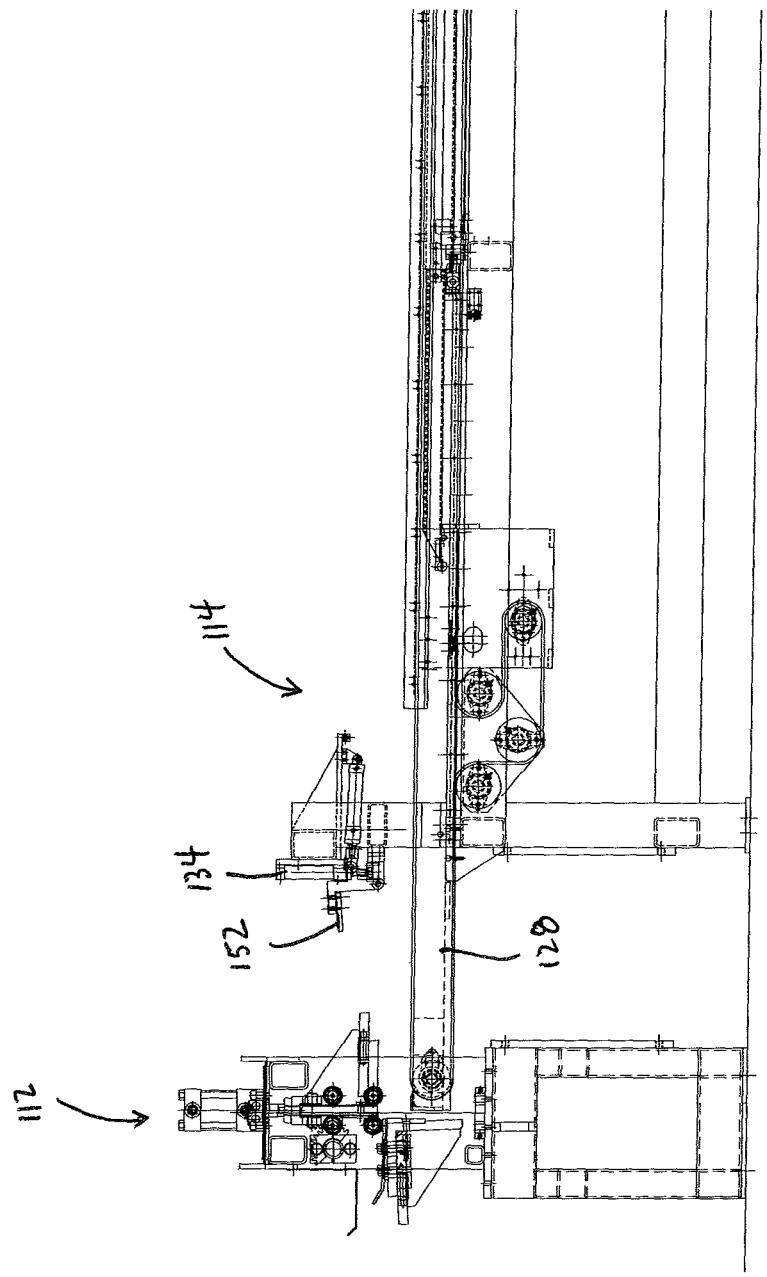
FIG. 14 is a side elevational view of the metal positioning and forming apparatus of FIG. 5, showing a more detailed illustration thereof and showing the retractable conveyor in an extended position.

Importantly, the retractable conveyor 128 of the second station 114 is linearly movable in the direction of arrow A, as shown in FIG. 12. In particular, the retractable conveyor 128 is linearly movable between a first position in close association with the first station 112, as shown in FIG. 15, and a second position in which the retractable conveyor 128 is spaced from the first station 112, as shown in FIG. 16.

Figure 15:
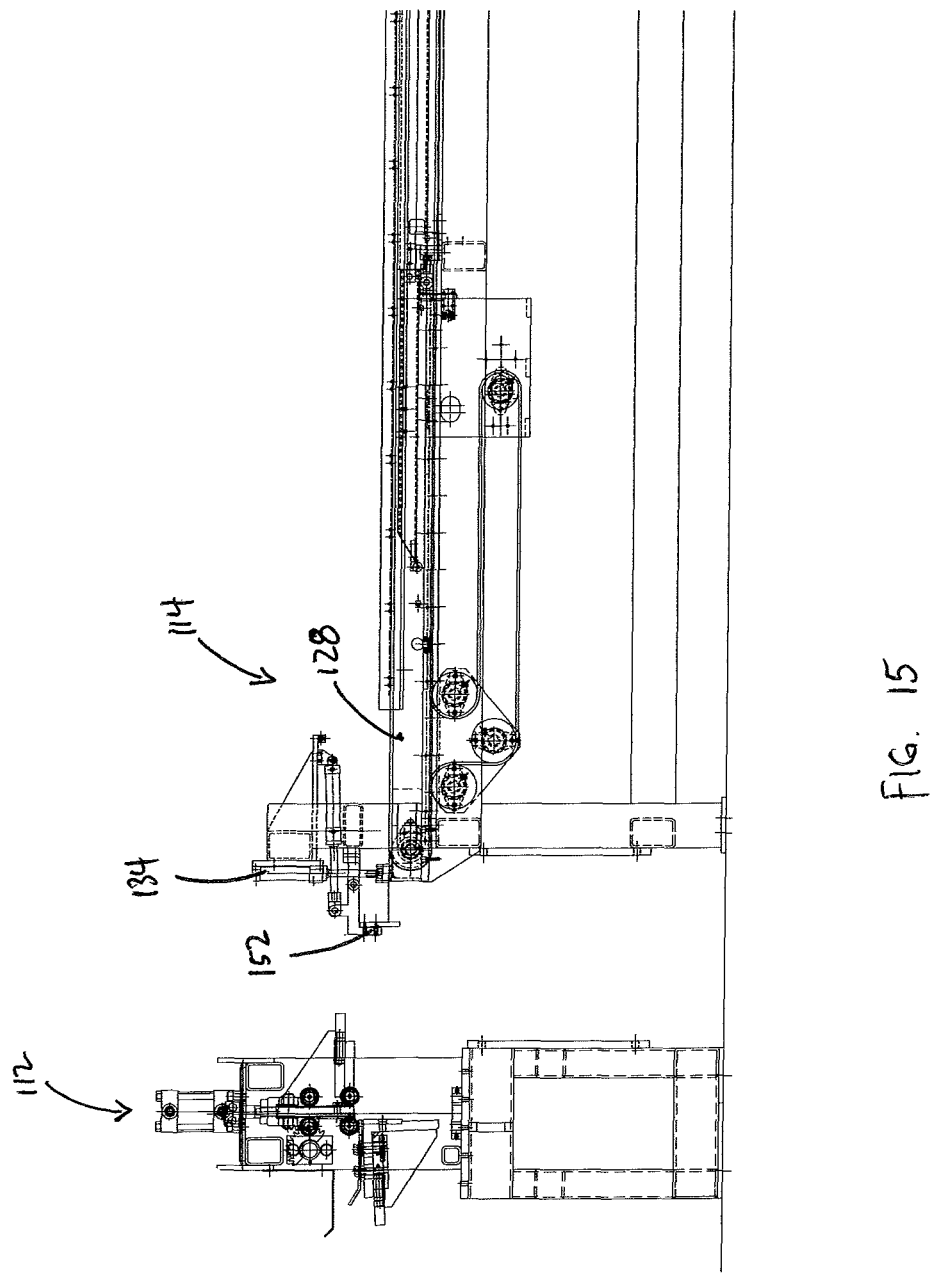
FIG. 15 is a side elevational view of the metal positioning and forming apparatus of FIG. 5, showing a more detailed illustration thereof and showing the retractable conveyor in a retracted position.

In operation, as the male lock seam is formed in the leading edge of the duct blank and the duct blank is separated from the web of material, the retractable conveyor 128 is advanced against the direction of travel of the metal web to the extended position shown in FIG. 15. At the same time, the clamp 134 and stop 136 are moved to their retracted, pass-through positions which allows the duct blank to be advanced downstream. In this position, the retractable conveyor 128 supports the web while it is fed forward and cut to proper length by the bending shear 126, and prevents the web from bowing or hanging down, which could cause jamming. The retractable conveyor 128 remains in this extended position until the duct blank passes the stop and clamp assembly 132, at which time the conveyor 128 retracts and is positioned for a subsequent roll forming operation, as discussed hereinafter.

Figure 10:
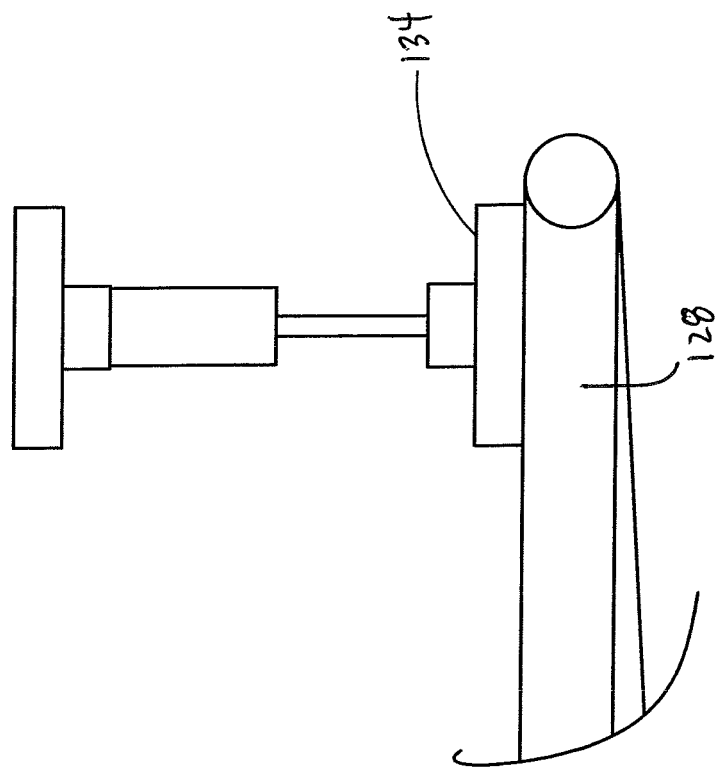
FIG. 10 is a side elevational view of the conveyor and holding clamp of FIG. 9, illustrating the holding clamp in a lowered, clamping position.
Figure 11:
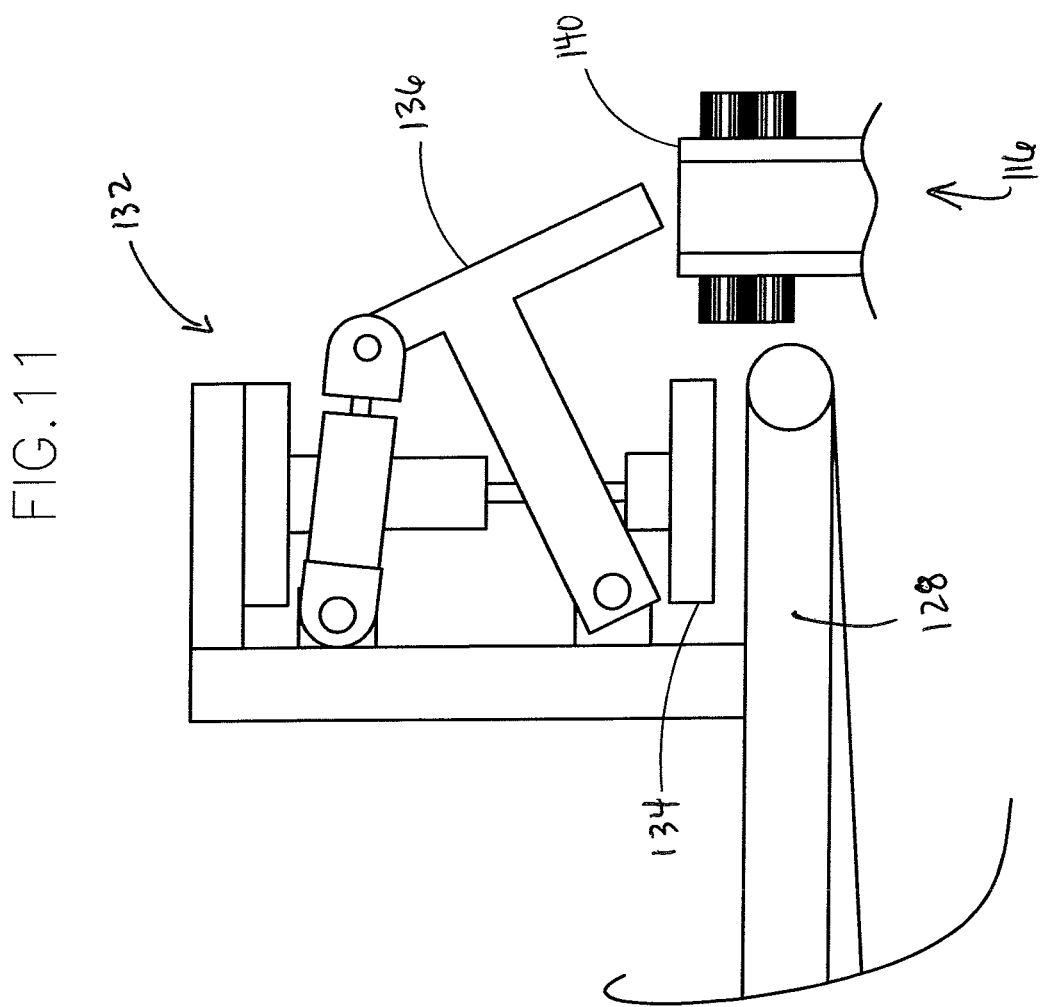
FIG. 11 is a side elevational view of a lock seam roll forming device of the apparatus of FIG. 5, showing the positing stop of FIG. 7 in its raised, pass-through position.

In particular, once the trailing edge of the duct blank passes the stop 136, the stop rotates downward to its engaging position, as illustrated in FIG. 8. The conveyor 128 then again reverses direction, moving the duct blank upstream, until the trailing edge of the duct blank contacts stop 136. At this position, clamp 134 is moved into clamping position, shown in FIG. 10, to clamp the duct blank against the retractable conveyor 128. Once the duct blank is clamped in proper position, stop 136 again rotates to its retracted, pass-through position shown in FIG. 7. While the figures of the present invention illustrate the utilization of a single clamp 134 and single stop 136, more than one clamp 134 and stop 136 may be utilized to provide additional clamping and alignment, respectively, without departing from the broader aspects of the present invention.

With reference to FIGS. 11-13 and 16, the third station 116 includes a female lock seam roll former 140 having a plurality of die pairs. In the preferred embodiment, the roll former 140 may generally take the form of any roll former commonly known in the art that is utilized to form various style lock seams. In particular, the roll former 140 may be configured to form any style of lockseam, such as a Pittsburgh seam or Snaplock seam, on the trailing edge of the duct blank, as discussed below. Importantly, the roll former 140 is mounted on a laterally traversing frame 142 that is positioned between the first station 112 and second station 114.

Once the duct blank is clamped in position by the clamp 134, and conveyor 128 is spaced from the first station 112, roll former 140 of the third station 116 moves in a direction substantially perpendicular to the axis of travel of the duct blank and engages the trailing edge of the duct blank. The roll former 140 travels across the trailing edge of the duct blank, perpendicular to the linear direction of travel of the duct blank, thereby forming a female lock seam. Traversing the roll forming head 140 may be accomplished via hydraulic, pneumatic or electrical means, although any other means known in the art may also be utilized without departing from the broader aspects of the present invention. As discussed in detail below, it is an important aspect of the present invention that the roll former head 140 is selectively movable orthogonal to the axis of travel of the web of material through the apparatus 100.

After forming the female lock seam in the trailing edge of the duct blank, the clamps 134 are released and the duct blank is moved linearly down the second station 114 by stationary feed conveyor 130 for additional operations. In particular, once seaming is complete, the conveyor 128 retracts (moves to the left in FIG. 12) and clamp 134 raises to its pass-through position, allowing the duct blank to proceed downstream through the system reaching feed conveyor 130. Once the trail edge of the duct blank is fully on conveyor 130, the roll former 140 is reversed and moves to its original starting position on one side of the apparatus 100. The retractable conveyor 128 is then extended to its starting position adjacent to the first station 112 such that the process can be repeated for another duct section.

As alluded to above, additional operations may be carried out downstream after formation of the male and female lock seams. In an embodiment, the duct blank may proceed forward through the system, reaching feed conveyor 130, transverse connection/transverse flange roll former 144, brake feed conveyor 146, bending brake 148 and finally exiting end conveyor 150, thus competing a fully automatic cycle generating a completed duct section. These subsequent operations may be any operations known in the art of duct section formation, including, but not limited to, the formation of flanges on the ends of the duct section and bending of the duct section to form an enclosed duct.

In particular, the transverse connection roll former 144 may take any form known in the art for forming any type of transverse flange known in the art. Moreover, the apparatus 100 of the present invention is capable of providing all styles of ducting including welded flange and raw edge connections using slide on flange technology in a fully automatic manner. As will be readily appreciated, the automatic duct making apparatus 100 of the present invention is capable of making any style of ducting by adding any downstream bending/forming stations necessary to achieve the desired style.

In an embodiment, the apparatus 100 may include a computer or programmable logic controller (not shown) and a plurality of switches, sensors and timers that operate in conjunction with one another and according to a set of instructions stored in memory. In particular, all of the operational sequences for forming a completed duct section may be carried out automatically under the control of the computer or programmable logic controller in concert with the switches, sensors and timers.

With further reference to FIGS. 13-16, in an embodiment, the apparatus 100 may include locating pins 152 as an alternative means of properly positioning the duct blank on the conveyor 128 for the subsequent female lock seam forming operation. As shown therein, the locating pins 152 are pivotally mounted to the second station 114. During operation, the conveyor 128 retracts to a position that allows the locating pins to pivot downward. Once in the down position, the conveyor 128 is reversed to transport the duct blank upstream until the locating pins 152 are contacted. In an embodiment, the pins 152 themselves can be used to complete a circuit confirming that the trailing edge of the duct blank is in correct position. Other sensing means known in the art may also be utilized without departing from the broader aspects of the present invention. Once the duct blank is confirmed to be in the proper position, holding clamps 134 are extended to clamp the duct blank to the conveyor frame. The holding clamps 134 hold the duct blank in proper position during retracting of the locating pins 152 during the roll forming operation, as discussed above.

A completed duct section 200 produced by the duct making apparatus 100 of the present invention is shown in FIG. 17. As shown therein the completed duct section has a male lock seam 210 formed by the bending shear 126, a female lock seam 212 formed by the transversely movable roll former 140, and a plurality of bends 214 that complete the rectangular duct section. The transverse end connections formed by transverse connection roll former 144 are omitted in FIG. 17.

As will be readily appreciated, by mounting the roll former 140 on a laterally movable frame 142, the roll former 140 is able to move orthogonally across the trailing edge of the stationary duct blank to form the female lock bend. This is in contrast to existing systems which typically put the duct blank in motion and move the blank laterally (i.e., orthogonal to the initial direction of travel) through a stationary roll-forming device to form both the male and female lock seams. As the need to move the duct blank sideways is obviated by the provision of the transversely movable roll former 140, all of the stations of the apparatus 100 of the present invention may be aligned linearly, as opposed to in a "U" or "Z" configuration as has been heretofore required in the art. With this linear arrangement of stations, the sheet material and the duct blank cut therefrom can be fed entirely linearly throughout the entire apparatus 100, from start end 110 to finish end 118.

As a result of this configuration, the apparatus 100 of the present invention is much narrower as compared to existing duct making apparatuses configured to handle the same size sheet material. In particular, in an embodiment, the duct making apparatus 100 of the present invention may be approximately half of the width of prior art complete duct fabrication systems. As will be readily appreciated, because of this smaller and narrower footprint, the apparatus 100 may be utilized in smaller shops, thereby allowing such smaller shops to compete with larger shops utilizing the wider, existing duct making systems by controlling costs and quality.

With existing systems, there is a need to move various sizes and gauges of sheet material through side motions to form the lock seams, which typically requires a variety of guiding and setting requirements to move the sheets squarely and accurately without jams, run off conditions or buckling difficulties. With the apparatus 100 of the present invention, however, these problems are eliminated because the sheet material/duct blank moves in a straight line from start to finish, allowing simple conveyance.

In addition to the above, the apparatus 100 of the present invention allows return to previous, more friendly notching and seaming in customary methods allowing minimal openings at the corners of the duct sections. This is desirable for the mechanical contractors because it reduces costs required to treat unnecessary openings in the notched corner area. This is in contrast to many existing systems that form a drive cleat before shearing the duct blank to length and then subsequently form the locks seams causing a substantial notch-back requirement so the cleat isn't crushed during the seaming operation.

In the appended claims, the terms "including" and "in which" are used as the plain-English equivalents of the respective terms "comprising" and "wherein." Moreover, in the following claims, the terms "first," "second," "third," "upper," "lower," "bottom," "top," "up," "down," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable any person skilled in the art to practice the embodiments of invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described duct making apparatus, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A duct making apparatus, comprising:
   a first station configured to accept a formable sheet material, said first station including a first mechanism for forming one of a male lock bend and a female lock seam in a leading edge of said formable sheet material;
   a second station having a retractable conveyor, said retractable conveyor being selectively movable from a first position in which said retractable conveyor is in close association with said first station, to a second position in which said retractable conveyor is spaced apart from said first station forming thereby a void between said first station and said second station, said retractable conveyor, when in said first position, supporting an underside of said sheet material;

wherein movement of said sheet material from said first station to said second station defines an axis of travel of said sheet material; and wherein a third station operates to form the other of said male lock bend and said female lock seam on a trailing edge of said formable sheet material when said retractable conveyor is in said second position and without altering said axis of travel of said formable sheet material, said third station including a roll forming assembly, said roll forming assembly being selectively movable in a direction substantially orthogonal to said axis of travel of said sheet material.

2. The duct making apparatus of claim 1, wherein: said first station further includes a coil straightener for straightening said sheet material received from a coil and a notching section configured to provide notches in corners of said sheet material.

3. The duct making apparatus of claim 1, wherein: said first station includes a mechanism for shearing said sheet material to form a generally rectangular duct blank flat pattern.

4. A duct making apparatus, comprising:
a first station configured to accept a formable sheet material, said first station including a first mechanism for forming one of a male lock bend and a female lock seam in a leading edge of said formable sheet material;
a second station having a retractable conveyor, said retractable conveyor being selectively movable from a first position in which said retractable conveyor is in close association with said first station, to a second position in which said retractable conveyor is spaced apart from said first station forming thereby a void between said first station and said second station;
wherein movement of said sheet material from said first station to said second station defines an axis of travel of said sheet material;
wherein a third station operates to form the other of said male lock bend and said female lock seam on a trailing edge of said formable sheet material when said retractable conveyor is in said second position and without altering said axis of travel of said formable sheet material;
wherein said second station further includes a positioning stop, said positioning stop being selectively movable between a pass-through position in which said sheet material is permitted to pass by said positioning stop, and an engaging position in which said trailing edge of said sheet material contacts said positioning stop; and
wherein said positioning stop is configured to position said sheet material in alignment with a roll forming assembly of said third station.

5. The duct making apparatus of claim 4, wherein: said roll forming assembly being selectively movable in a direction substantially orthogonal to said axis of travel of said sheet material.

6. The duct making apparatus of claim 5, wherein: said roll forming assembly selectively forms the other of said male lock bend and said female lock seam in said trailing edge of said sheet material, when a portion of said roll forming assembly is selectively inserted into said void via said orthogonal movement.

7. The duct making apparatus of claim 4, wherein: said second station further includes at least one clamp mechanism, said clamp mechanism being selectively movable between a pass-though position in which said clamp mechanism is spaced from said sheet material, and a clamping position in which said clamp mechanism contacts said sheet material.

8. A duct making apparatus, comprising:
a first station configured to accept a formable sheet material, said first station including a mechanism for shearing said sheet material to create a duct blank and for forming a male lock bend in a leading edge of said duct blank;
a second station configured to receive said duct blank from said first station, said second station including a retractable conveyor for moving said duct blank along an axis of travel; and
a third station including a roll forming assembly, said roll forming assembly being selectively movable into and out of a space between said first station and said second station in a direction orthogonal to said axis of travel, said roll forming assembly being configured to engage a trailing edge of said duct blank to form a female lock seam;
wherein said retractable conveyor is selectively movable from a first position in which said retractable conveyor is in close association with said first station, and a second position in which said retractable conveyor is spaced from said first station to allow passage of said roll forming assembly; and
wherein said retractable conveyor, when in said first position, supports an underside of said duct blank.

9. The duct making apparatus of claim 8, wherein: said second station further includes a positioning stop, said positioning stop being selectively movable between a pass-through position in which said duct blank is permitted to pass by said positioning stop, and an engaging position in which said trailing edge of said duct blank contacts said positioning stop;
wherein said positioning stop is configured to position said duct in alignment with said roll forming assembly.

10. The duct making apparatus of claim 9, wherein: said second station further includes at least one clamp mechanism, said clamp mechanism being selectively movable between a pass-though position in which said clamp mechanism is spaced from said duct blank, and a clamping position in which said clamp mechanism contacts said duct blank.

11. The duct making apparatus of claim 8, wherein: said first station further includes a coil straightener for straightening said sheet material received from a coil and a notching section configured to provide notches in corners of said sheet material.

* * * * *